United States Patent
Giannuzzi

(10) Patent No.: US 10,207,182 B2
(45) Date of Patent: Feb. 19, 2019

(54) HAPTICS DEVICES AND METHODS FOR CONTROLLING A HAPTICS DEVICE

(71) Applicant: RAZER (ASIA-PACIFIC) PTE. LTD., Singapore (SG)

(72) Inventor: Joseph Mario Giannuzzi, Cedar Park, TX (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/578,810

(22) PCT Filed: Jun. 3, 2015

(86) PCT No.: PCT/SG2015/050139
§ 371 (c)(1),
(2) Date: Dec. 1, 2017

(87) PCT Pub. No.: WO2016/195588
PCT Pub. Date: Dec. 8, 2016

(65) Prior Publication Data
US 2018/0154254 A1    Jun. 7, 2018

(51) Int. Cl.
| | |
|---|---|
| *G06F 3/16* | (2006.01) |
| *A63F 13/285* | (2014.01) |
| *G06F 3/01* | (2006.01) |
| *A63F 13/424* | (2014.01) |
| *A63F 13/215* | (2014.01) |
| *A63F 13/24* | (2014.01) |
| *A63F 13/79* | (2014.01) |
| *H04L 29/08* | (2006.01) |

(52) U.S. Cl.
CPC .......... *A63F 13/285* (2014.09); *A63F 13/215* (2014.09); *A63F 13/24* (2014.09); *A63F 13/424* (2014.09); *A63F 13/79* (2014.09); *G06F 3/016* (2013.01); *G06F 3/16* (2013.01); *G06F 2203/013* (2013.01); *G06F 2203/015* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,319,415 B2 * | 4/2016 | Lietz | H04L 63/105 |
| 9,678,571 B1 * | 6/2017 | Robert | G06F 3/016 |
| 2009/0115838 A1 * | 5/2009 | Kenoyer | H04N 7/147 |
| | | | 348/14.08 |
| 2010/0108408 A1 | 5/2010 | Colgate et al. | |
| 2011/0037546 A1 | 2/2011 | Marie | |
| 2014/0247227 A1 | 9/2014 | Jiang et al. | |
| 2016/0259480 A1 * | 9/2016 | Augenbergs | G06F 3/016 |

FOREIGN PATENT DOCUMENTS

| | | |
|---|---|---|
| EP | 2629178 A1 | 8/2013 |
| EP | 2778901 A1 | 9/2014 |

\* cited by examiner

*Primary Examiner* — Ronald Laneau
(74) *Attorney, Agent, or Firm* — Polsinelli PC

(57) ABSTRACT

According to various embodiments, a haptics device may be provided. The haptics device may include: an input circuit configured to receive audio input; a phase determination circuit configured to determine a phase of the audio input; a peak amplitude determination circuit configured to determine a peak amplitude of the audio input; and a haptics controller configured to control at least one actuator based on the phase of the audio input and based on the peak amplitude of the audio input.

20 Claims, 4 Drawing Sheets

HAPTICS DEVICES AND METHODS FOR CONTROLLING A HAPTICS DEVICE

TECHNICAL FIELD

Various embodiments generally relate to haptics devices and methods for controlling a haptics device.

BACKGROUND

Commonly used haptics implementations in gaming systems and gaming controllers are limited both from a range of haptics devices used, the effects and the fidelity of the haptics sensations/feedback. Thus, there may be a need to improve haptics implementations.

SUMMARY OF THE INVENTION

According to various embodiments, a haptics device may be provided. The haptics device may include: an input circuit configured to receive audio input; a phase determination circuit configured to determine a phase of the audio input; a peak amplitude determination circuit configured to determine a peak amplitude of the audio input; and a haptics controller configured to control at least one actuator based on the phase of the audio input and based on the peak amplitude of the audio input.

According to various embodiments, a method for controlling a haptics device may be provided. The method may include: receiving audio input; determining a phase of the audio input; determining a peak amplitude of the audio input; and controlling at least one actuator based on the phase of the audio input and based on the peak amplitude of the audio input.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1A:
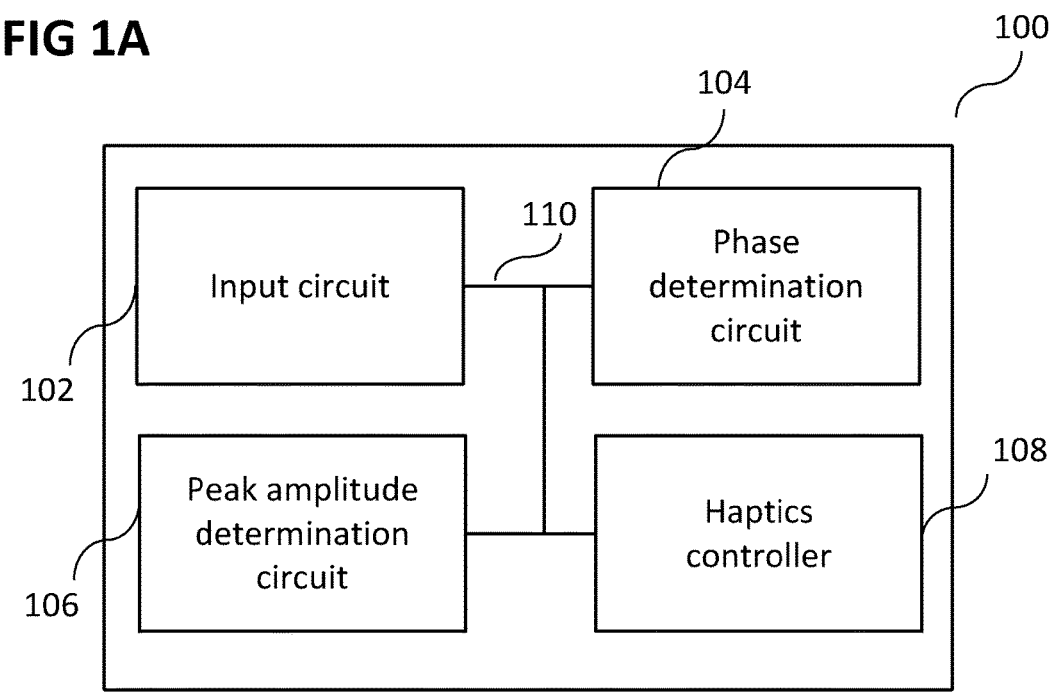
FIG. 1A shows a haptics device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the haptics device as described in this description may include a memory which is for example used in the processing carried out in the haptics device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" (which may also be referred to as a "block" in the following) may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Haptics, at a low level is a relatively unknown technology but it is actually part of our everyday lives. Smart phones may employ haptics feedback by way of using concentric motors to vibrate the cell phone to alert user to texts and/or phone calls. Another example where haptics is used is in console game systems, specifically the game controllers. They too employ concentric motors and other type of haptics devices to make the game play more immersive and realistic by vibrating the game controller at key times during game play. There is a great deal of opportunity to improve, greatly expand and differentiate consumer products by way of unique applications of haptics especially within gaming systems and the peripheral devices that gamers use.

An area where haptics has achieved some level of penetration in the CE (customer electronics) market and a level of general acceptance/understanding is in gaming, specifically console game systems and the hand held controllers they use. These controllers may have a single haptics actuator that "rumbles" or vibrates the controller at a predetermined rate or frequency, level of intensity and for a duration of time. There is no ability for the user to further control or customize the haptics sensation. The lack of a standard for any level of haptics is an ongoing challenge as it, in part, stalls out innovation. Given commonly used implementations are almost all "single" channel designs points to a lack of development at the architectural level and between hardware developers and gaming/software ISV (Independent Software Vendor). If a simple straight forward solution could be establish an OEM (Original Equipment Manufacturer) could gain an advantage and if desired establish or drive a standard in the industry.

Commonly used haptics implementations in gaming systems and gaming controllers are limited both from a range of haptics devices used, the effects and the fidelity of the haptics sensations/feedback. The implementations are "single" channel designs and allow for a limited range of haptics sensations/feedback with no real fidelity. There has been some work in the area of "stereo" haptics but the control mechanisms are invasive meaning they require fundamental architectural changes at the system/controller HW and/or SW levels and potentially within the game source code. These limitations have caused a lack of adoption and stalled advanced development into improving haptics and further developing the technology. The lack of an industry standard and/or a governing body is further evidence of the lack of adoption and the slowing of advanced development.

According to various embodiments, a simpler, minimally invasive solution may be provided to overcome some or most of the noted limitations.

According to various embodiments, a secondary high frequency audio and digital control layer for haptics may be provided.

FIG. 1A shows a haptics device 100 according to various embodiments. The haptics device 100 may include an input circuit 102 configured to receive audio input. The haptics device 100 may further include a phase determination circuit 104 configured to determine a phase of the audio input. The haptics device 100 may further include a peak amplitude determination circuit 106 configured to determine a peak amplitude of the audio input. The haptics device 100 may further include a haptics controller 108 configured to control at least one actuator based on the phase of the audio input and based on the peak amplitude of the audio input. The input circuit 102, the phase determination circuit 104, the peak amplitude determination circuit 106, and the haptics controller 108 may be coupled with each other, like indicated by lines 110, for example electrically coupled, for example using a line or a cable, and/or mechanically coupled.

In other words, a haptics device according to various embodiments may receive an audio signal and may control at least one actuator based on a phase of the audio signal and based on a peak amplitude of the audio signal.

According to various embodiments, the haptics controller 108 may further be configured to position a channel corresponding to the audio input in time based on the phase of the audio input and based on the peak amplitude of the audio input.

According to various embodiments, the haptics controller 108 may further be configured to position a channel corresponding to the audio input in phase based on the phase of the audio input and based on the peak amplitude of the audio input.

According to various embodiments, the haptics controller 108 may further be configured to position a channel corresponding to the audio input within a relation to an audio stream corresponding to the audio input based on the phase of the audio input and based on the peak amplitude of the audio input.

According to various embodiments, the phase determination circuit 104 and the peak amplitude determination circuit 106 may be provided in a software layer.

According to various embodiments, the phase determination circuit 104 and the peak amplitude determination circuit 106 may be provided in an API control layer.

According to various embodiments, the haptics controller 108 may further be configured to control at least one further actuator independent from the determined phase of the audio input and independent from the determined peak amplitude of the audio input.

Figure 1C:
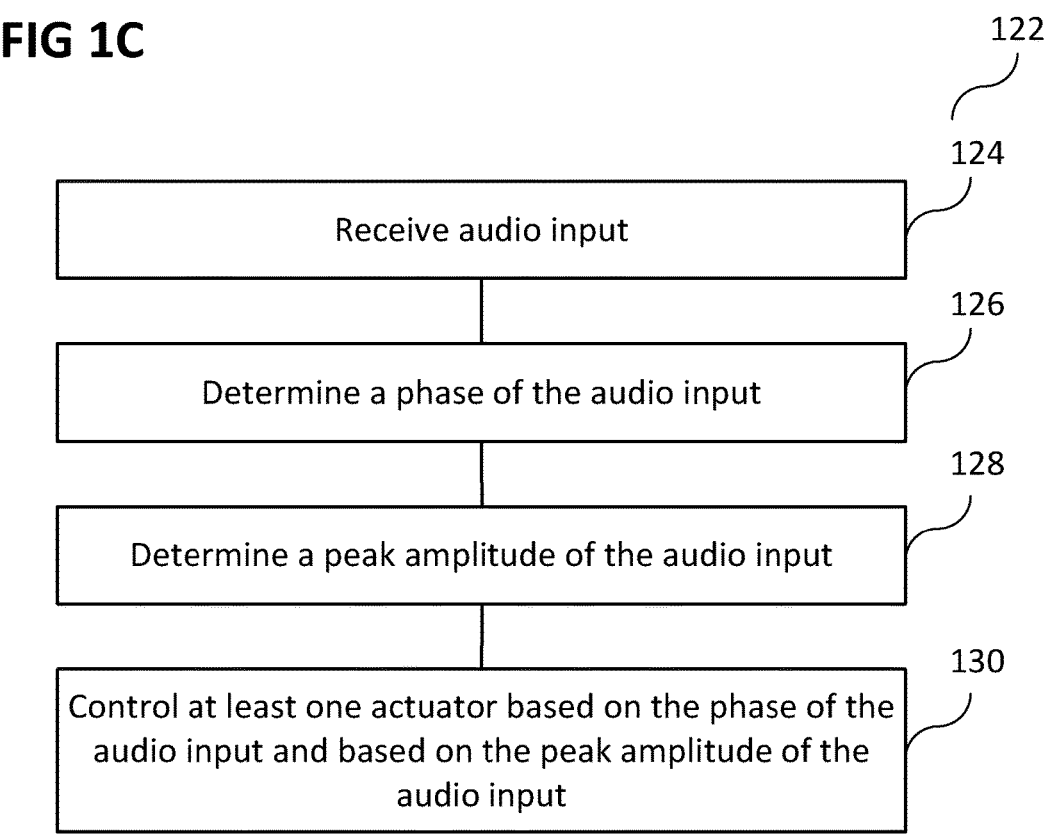
FIG. 1C shows a flow diagram illustrating a method for controlling a haptics device according to various embodiments.
Figure 1B:
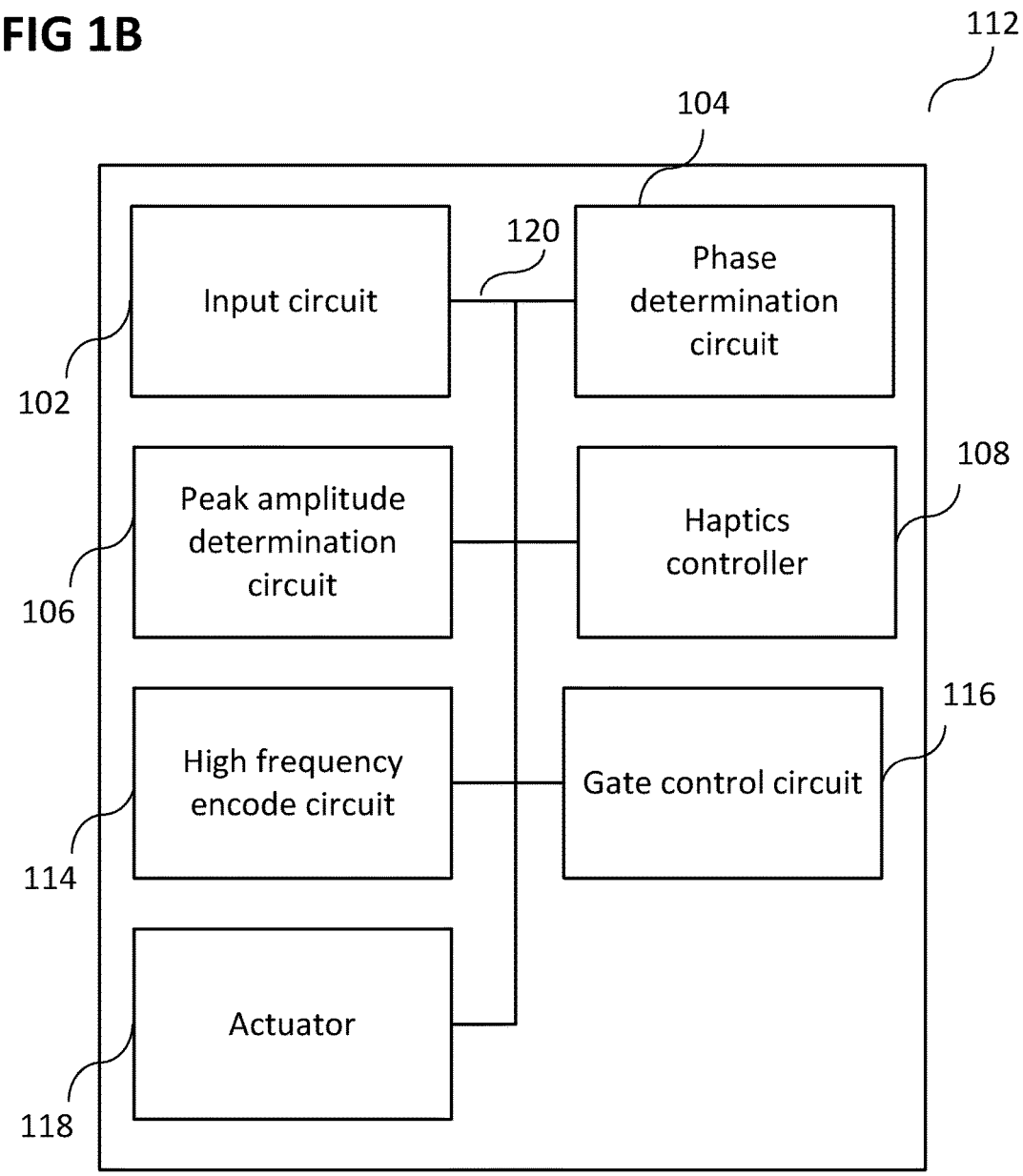
FIG. 1B shows a haptics device according to various embodiments.

FIG. 1B shows a haptics device 112 according to various embodiments. The haptics device 112 may, similar to the haptics device 100 shown in FIG. 1A, include an input circuit 102 configured to receive audio input. The haptics device 112 may, similar to the haptics device 100 shown in FIG. 1A, further include a phase determination circuit 104 configured to determine a phase of the audio input. The haptics device 112 may, similar to the haptics device 100 shown in FIG. 1A, further include a peak amplitude determination circuit 106 configured to determine a peak amplitude of the audio input. The haptics device 112 may, similar to the haptics device 100 shown in FIG. 1A, further include a haptics controller 108 configured to control at least one actuator based on the phase of the audio input and based on the peak amplitude of the audio input. The haptics device 112 may further include a high frequency encode circuit 114, like will be described in more detail below. The haptics device 112 may further include a gate control circuit 116, like will be described in more detail below. The haptics device 112 may further include the at least one actuator 118. The input circuit 102, the phase determination circuit 104, the peak amplitude determination circuit 106, the haptics controller 108, the high frequency encode circuit 114, the gate control circuit 116, and the at least one actuator 118 may be coupled with each other, like indicated by lines 120, for example electrically coupled, for example using a line or a cable, and/or mechanically coupled.

According to various embodiments, the gate control circuit 116 may be configured to activate the high frequency encode circuit 114.

According to various embodiments, the haptics controller 108 may further be configured to control the at least one actuator 118 based on user assigned secondary haptics source triggers.

According to various embodiments, the user assigned secondary haptics source triggers may be based on a user profile/s maintained in a cloud based service and can be associated with a specific application and/or game.

According to various embodiments, the user profile may be stored in a cloud.

According to various embodiments, the haptics device 112 may be provided in a game controller input device.

According to various embodiments, the game controller input device may include or may be at least one of a joystick or a gamepad.

FIG. 1C shows a flow diagram 122 illustrating a method for controlling a haptics device. In 124, audio input may be received. In 126, a phase of the audio input may be determined. In 128, a peak amplitude of the audio input may be determined. In 130, at least one actuator may be controlled based on the phase of the audio input and based on the peak amplitude of the audio input.

According to various embodiments, the method may further include positioning a channel corresponding to the audio input in time based on the phase of the audio input and based on the peak amplitude of the audio input.

According to various embodiments, the method may further include positioning a channel corresponding to the audio input in phase based on the phase of the audio input and based on the peak amplitude of the audio input.

According to various embodiments, the method may further include positioning a channel corresponding to the audio input within a relation to an audio stream corresponding to the audio input based on the phase of the audio input and based on the peak amplitude of the audio input.

According to various embodiments, determining the phase and determining the peak amplitude may be provided in a software layer.

According to various embodiments, determining the phase and determining the peak amplitude may be provided in an API control layer.

According to various embodiments, the method may further include controlling at least one further actuator independent from the determined phase of the audio input and independent from the determined peak amplitude of the audio input.

According to various embodiments, the method may further include high frequency encoding.

According to various embodiments, the method may further include activating the high frequency encoding.

According to various embodiments, the method may further include controlling the at least one actuator based on user assigned secondary haptics source triggers.

According to various embodiments, the user assigned secondary haptics source triggers may be based on a user profile.

According to various embodiments, the user profile may be stored in a cloud.

According to various embodiments, the haptics device may be provided in a game controller input device.

According to various embodiments, the game controller input device may include or may be at least one of a joystick or a gamepad.

According to various embodiments, the haptics device may include the at least one actuator.

According to various embodiments, a computer-readable medium may be provided which may include instructions which, when executed by a processor, make the processor perform a method for controlling a haptics device, for example the method described above.

According to various embodiments, a minimally invasive haptics control layer may be provided which allows for a wider range of haptics effects, more fidelity and specifically to enable "dual channel" haptics with an element of discrete control over the "secondary" channel via a programmable software interface, (API (application programming interface)/driver) at the system OS level. The solution may include haptics enabling hardware in the systems, and/or the peripheral controller devices combined with an API that may work at the OS (operating system) level to intercept the stereo audio stream as it is processed by the OS in real time and impressed upon that audio signal a set high frequency impulses or digitally encrypted control signals that may be seen by the haptics controller and trigger the haptics device/s to respond in a predetermined way. This path may be considered the second channel of haptics control. The normal audio channel may trigger haptics responses as well but may be limited; specifically it could only trigger haptics responses based on the "level" of the audio signal and/or by the "frequency" of a given range of audio impulse. For example a very low frequency could be interrupted as an explosion while gun fire and the frequency range for that type of sound may be in the upper or higher frequency range.

Figure 2:
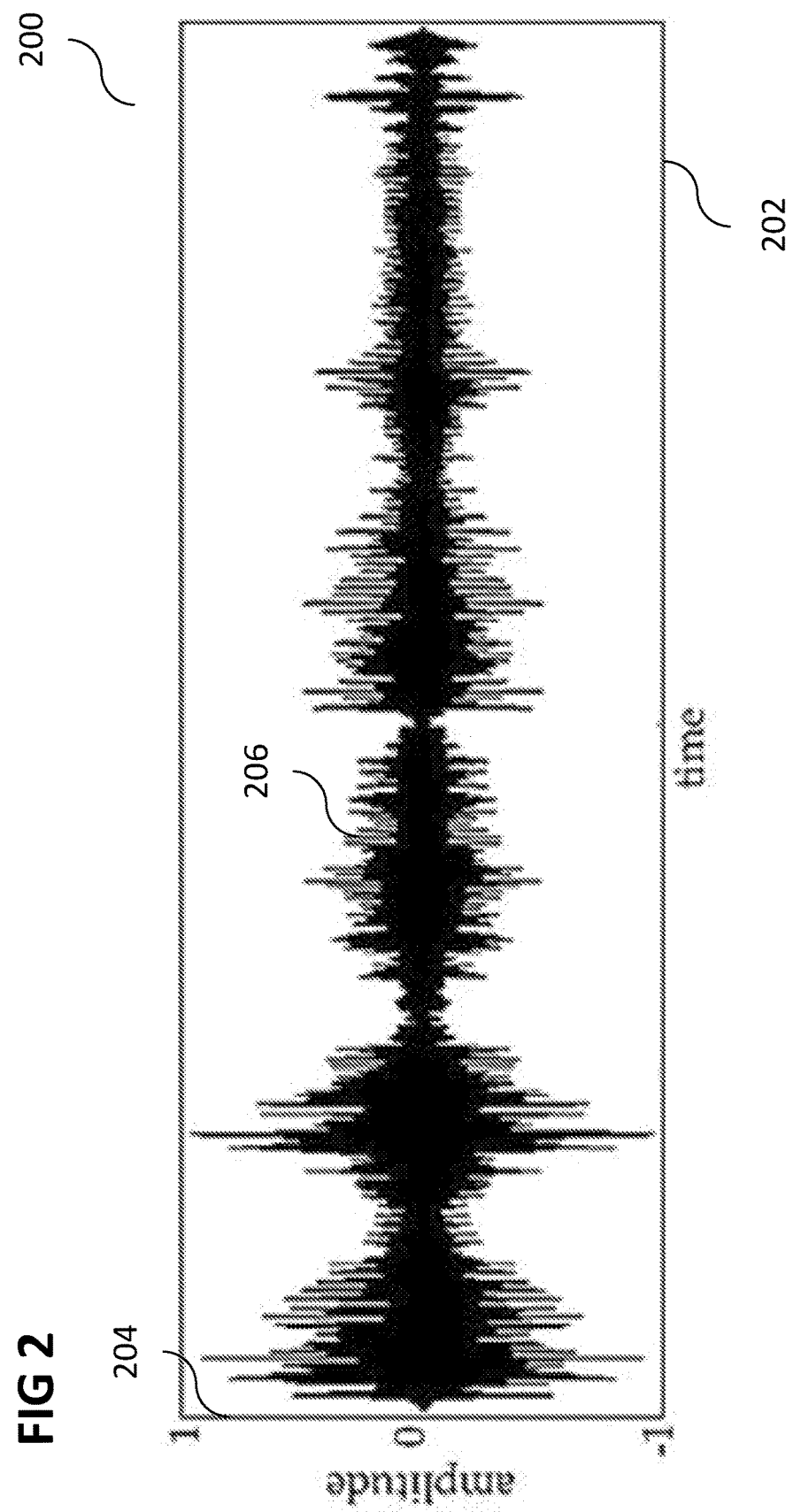
FIG. 2 shows an illustration of a haptics audio stimulus according to various embodiments.

FIG. 2 shows an illustration 200 of a haptics audio stimulus according to various embodiments, for example a standard system stereo audio signal 206 having an amplitude (shown over vertical axis 204) shown over time (like illustrated by horizontal axis 202).

In a single channel haptics implementation, the amplitude and duration of various frequency ranges of the system audio may trigger the haptics controller to drive the haptics device to respond. This may require, in some cases, filtering networks to detect the target audio frequency range/s, (low, high or low to high) which are used to drive the haptics device/s in a pre-determine way, (i.e. intensity and duration are the most typical parameters that are controlled).

Figure 3:
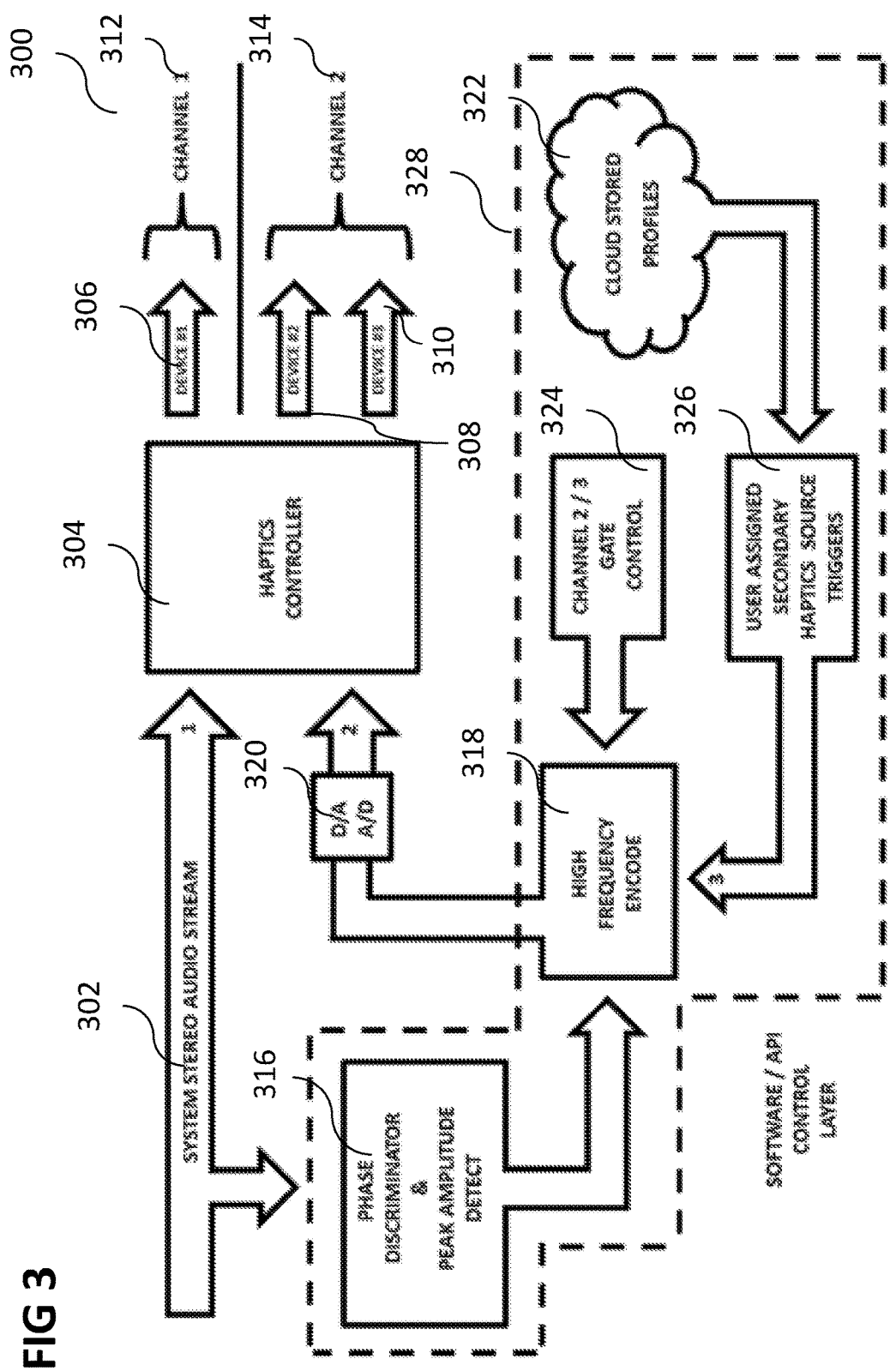
FIG. 3 shows an illustration of a dual channel haptics flow diagram according to various embodiments.

FIG. 3 shows an illustration 300 of a dual channel haptics flow diagram with 3 layers of control according to various embodiments.

FIG. 3 shows an overview of the dual channel haptics data flow according to various embodiments. There may be some lower level control mechanisms, like will be described below. Path #1 (from a system stereo audio system 302 to a haptics controller 304) may be a path where the haptics controller 304 is triggered by the system or game audio. The haptics controller 304 may then actuate a first device 306 (which may be referred to as device #1), which may correspond to a first channel 312. In path #2 (from the D/A (digital/analog)-A/D (analog/digital) converter 320 to the haptics controller 304, wherein the D/A-A/D converter 320 (which may also be referred to as a an D/A-A/D block) may be provided to allow for a digital audio signal or the conversion of an analog signal to a digital signal to be passed into the haptics controller, and it is to be noted that this block may be programmatically configured to be a simple "pass through" if desired), a phase discriminator (which may also be referred to as a phase determination circuit, and which may be provided in a processing block 316) may look at the system source audio and may determine a phase of the system audio signal in real time. A peak amplitude detect portion (which may be referred to as a peak amplitude determination circuit) of the processing block 316 may look at a peak amplitude of the system audio in real time. These two data points may then be used to position (wherein "positioning" according to various embodiments may refer to when in time a haptics control signal is invoked and is acted upon in relation to the subject audio stream) the second channel of haptics control signals both in time, phase and/or within relation to the system/game audio stream if it is being used to trigger lower level haptics responses different from those being applied to path #1. If the user were to choose to not play the game audio the second channel, path #2 may be used to implement a level of haptics sensation based on other trigger stimulus, i.e. game meta data and/or from system level events, specific in game key strokes or sequences that translate to game related actions, i.e. gun reloads, weapons switching, etc. The "gate control" block 324 may be used to activate the high frequency encode block by using the modified audio delivered via path #2 and/or by passing user assigned digital triggers to the haptics controller 304 via path #3 (from user assigned secondary haptics source triggers 326 (which may be based on cloud stored profiles 322) to a high frequency encode block 318. The high frequency encode block 318 can be used to empress a high frequency signal into the subject audio stream that will allow for embedded haptics event triggers to be detected by the haptics controller. It is to be noted that this block may be controlled programmatically by way of the "Channel 2/3 Gate Control" block 324. If channel #3 is used exclusively then the "High Frequency Encode" and/or the D/A-A/D blocks may set to "pass through mode". The high frequency encode block 328 does not takes place if digital triggers are used. It will be understood that the portions of FIG. 3 included in the dashed box 328 may be provided in a software/API control layer. The haptics controller 304 may, for example based on the input via path #2, control a second device 308 and a third device 310, corresponding to a second channel 314. Each of the first device 306, the second device 308, and the third device 310 may be a haptics actuator, for example a concentric motor, a piezo electrics based device or an audio based transducer. Each of the first device 306, the second device 308, and the third device 310 may be driven by either path #1 or #2.

According to various embodiments, a dual channel haptics control layer may be provided. According to various embodiments, devices and methods may provide a mechanism by which the haptics sensation is delivered to the device embedded in the context of a controller or enabled device dedicated/connected to a secondary channel Single channel haptics solutions are static and cannot be altered. With a second, truly independent channel according to various embodiments, combined with the fixed channel, the game play experience may be significantly improved and further refined by the user to make it more immersive.

According to various embodiments, the devices and methods may be flexible and allow for a user to tailor his haptics experience by using the secondary channel "if" and "as" needed. They allow for the user to take advantage of the second channel to dynamically reassign trigger sources, configure and customize them based on the application and/or the usage model.

Devices and methods according to various embodiments relate to haptics for gaming devices, haptics controllers, stereo haptics, a haptics control layer, dual layer haptics, and/or dual channel haptics.

According to various embodiments, a secondary high frequency audio and digital control layer for haptics may be provided. A dual channel haptics control layer design according to various embodiments may provide a second high frequency channel for haptics operations that enhances the functions of the haptics movements on the game controller.

According to various embodiments, a minimally invasive haptics control layer may be provided that allows for a wider range of haptics effects, more fidelity and specifically to enable dual channel haptics with an element of discrete control over a secondary channel via a programmable software interface, (API/driver) at the system OS level. Various embodiments may include haptics enabling hardware in the systems, and/or the peripheral controller devices combined with an API that may work at the OS level to intercept the stereo audio stream as it is processed by the OS in real time. A set high frequency impulses or digitally encrypted control signals may be impressed upon that audio signal. These signals may be seen by the haptics controller to trigger the haptics device to respond in a predetermined way. This path may be considered the second channel of haptics control.

The normal audio channel may trigger haptics responses as well but may be limited. Specifically it may only trigger haptics responses based on the "level" of the audio signal and/or based on the "frequency" of a given range of an audio impulse. For example a very low frequency may be interrupted as an explosion while gun fire and the frequency range for that type of sound would be in the upper or higher frequency range.

According to various embodiments, a first path may be a path where the haptics controller is triggered by the system/game audio. In a second path, the phase discriminator may look at the system source audio and may determine the phase of the system audio signal in real time. The peak amplitude detect portion of the processing block may look at the peak amplitude of the system audio in real time. These two data points may then be used to position the second channel of haptics control signals both in time, phase and/or within relation to the system/game audio stream if it is being used to trigger lower level haptics responses different from those being applied to first path. If the user were to choose to not play the game audio the second channel, the second path may be used to implement a level of haptics sensation based on other trigger stimulus, i.e. game meta data and/or from system level events, specific in game key strokes or sequences that translate to game related actions, i.e. gun reloads, weapons switching, etc. The gate control block may be used to activate the high frequency encode block by using the modified audio delivered via the second path and/or by passing user assigned digital triggers to the haptics controller via a third path. High frequency encode may not take place if digital triggers are used.

The following examples pertain to further embodiments.

Example 1 is a haptics device comprising: an input circuit configured to receive audio input; a phase determination circuit configured to determine a phase of the audio input; a peak amplitude determination circuit configured to determine a peak amplitude of the audio input; and a haptics controller configured to control at least one actuator based on the phase of the audio input and based on the peak amplitude of the audio input.

In example 2, the subject-matter of example 1 can optionally include that the haptics controller is further configured to position a channel corresponding to the audio input in time based on the phase of the audio input and based on the peak amplitude of the audio input.

In example 3, the subject-matter of any one of examples 1 to 2 can optionally include that the haptics controller is further configured to position a channel corresponding to the audio input in phase based on the phase of the audio input and based on the peak amplitude of the audio input.

In example 4, the subject-matter of any one of examples 1 to 3 can optionally include that the haptics controller is further configured to position a channel corresponding to the audio input within a relation to an audio stream corresponding to the audio input based on the phase of the audio input and based on the peak amplitude of the audio input.

In example 5, the subject-matter of any one of examples 1 to 4 can optionally include that the phase determination circuit and the peak amplitude determination circuit are provided in a software layer.

In example 6, the subject-matter of any one of examples 1 to 5 can optionally include that the phase determination circuit and the peak amplitude determination circuit are provided in an API control layer.

In example 7, the subject-matter of any one of examples 1 to 6 can optionally include that the haptics controller is further configured to control at least one further actuator independent from the determined phase of the audio input and independent from the determined peak amplitude of the audio input.

In example 8, the subject-matter of any one of examples 1 to 7 can optionally include a high frequency encode circuit.

In example 9, the subject-matter of example 8 can optionally include a gate control circuit configured to activate the high frequency encode circuit.

In example 10, the subject-matter of any one of examples 1 to 9 can optionally include that the haptics controller is further configured to control the at least one actuator based on user assigned secondary haptics source triggers.

In example 11, the subject-matter of any one of examples 1 to 10 can optionally include that the user assigned secondary haptics source triggers are based on a user profile.

In example 12, the subject-matter of example 11 can optionally include that the user profile is stored in a cloud.

In example 13, the subject-matter of any one of examples 1 to 12 can optionally include that the haptics device is provided in a game controller input device.

In example 14, the subject-matter of example 13 can optionally include that the game controller input device comprises at least one of a joystick or a gamepad.

In example 15, the subject-matter of any one of examples 1 to 14 can optionally include the at least one actuator.

Example 16 is a method for controlling a haptics device, the method comprising: receiving audio input; determining a phase of the audio input; determining a peak amplitude of the audio input; and controlling at least one actuator based on the phase of the audio input and based on the peak amplitude of the audio input.

In example 17, the subject-matter of example 16 can optionally include positioning a channel corresponding to the audio input in time based on the phase of the audio input and based on the peak amplitude of the audio input.

In example 18, the subject-matter of any one of examples 16 to 17 can optionally include positioning a channel corresponding to the audio input in phase based on the phase of the audio input and based on the peak amplitude of the audio input.

In example 19, the subject-matter of any one of examples 16 to 18 can optionally include positioning a channel corresponding to the audio input within a relation to an audio stream corresponding to the audio input based on the phase of the audio input and based on the peak amplitude of the audio input.

In example 20, the subject-matter of any one of examples 16 to 19 can optionally include that determining the phase and determining the peak amplitude are provided in a software layer.

In example 21, the subject-matter of any one of examples 16 to 20 can optionally include that determining the phase and determining the peak amplitude are provided in an API control layer.

In example 22, the subject-matter of any one of examples 16 to 21 can optionally include controlling at least one further actuator independent from the determined phase of the audio input and independent from the determined peak amplitude of the audio input.

In example 23, the subject-matter of any one of examples 16 to 22 can optionally include high frequency encoding.

In example 24, the subject-matter of example 23 can optionally include activating the high frequency encoding.

In example 25, the subject-matter of any one of examples 16 to 24 can optionally include controlling the at least one actuator based on user assigned secondary haptics source triggers.

In example 26, the subject-matter of any one of examples 16 to 25 can optionally include that the user assigned secondary haptics source triggers are based on a user profile.

In example 27, the subject-matter of example 26 can optionally include that the user profile is stored in a cloud.

In example 28, the subject-matter of any one of examples 16 to 27 can optionally include that the haptics device is provided in a game controller input device.

In example 29, the subject-matter of example 28 can optionally include that the game controller input device comprises at least one of a joystick or a gamepad.

In example 30, the subject-matter of any one of examples 16 to 29 can optionally include that the haptics device comprises the at least one actuator.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A haptics device comprising:
   an input circuit configured to receive audio input;
   a phase determination circuit configured to determine a phase of the audio input;
   a peak amplitude determination circuit configured to determine a peak amplitude of the audio input; and
   a haptics controller configured to control at least one actuator based on the determined phase of the audio input and based on the determined peak amplitude of the audio input, wherein the haptics controller is further configured to position a channel corresponding to the audio input based on the determined phase of the audio input and based on the determined peak amplitude of the audio input.

2. The haptics device of claim 1,
   wherein the positioning of the channel is in time, in phase, or within a relation to an audio stream.

3. The haptics device of claim 1,
   wherein the phase determination circuit and the peak amplitude determination circuit are provided in at least one of a software layer or an API control layer.

4. The haptics device of claim 1,
wherein the haptics controller is further configured to control at least one further actuator independent from the determined phase of the audio input and independent from the determined peak amplitude of the audio input.

5. The haptics device of claim 1, further comprising:
a high frequency encode circuit.

6. The haptics device of claim 5, further comprising:
a gate control circuit configured to activate the high frequency encode circuit.

7. The haptics device of claim 1,
wherein the haptics controller is further configured to control the at least one actuator based on user assigned secondary haptics source triggers.

8. The haptics device of claim 1,
wherein the user assigned secondary haptics source triggers are based on a user profile.

9. The haptics device of claim 8,
wherein the user profile is stored in a cloud.

10. The haptics device of claim 1,
wherein the haptics device is provided in a game controller input device.

11. The haptics device of claim 10,
wherein the game controller input device comprises at least one of a joystick or a gamepad.

12. The haptics device of claim 1, further comprising:
the at least one actuator.

13. A method for controlling a haptics device, the method comprising:
receiving audio input by an input circuit;
determining a phase of the audio input by a phase determination circuit;
determining a peak amplitude of the audio input by a peak amplitude determination circuit; and
controlling, by a haptics controller, at least one actuator based on the determined phase of the audio input and based on the determined peak amplitude of the audio input, and positioning a channel corresponding to the audio input based on the determined phase of the audio input and based on the determined peak amplitude of the audio input.

14. The method of claim 13, further comprising:
positioning the channel corresponding to the audio input in time based on the determined phase of the audio input and based on the determined peak amplitude of the audio input.

15. The method of claim 13, further comprising:
positioning the channel corresponding to the audio input in phase based on the determined phase of the audio input and based on the determined peak amplitude of the audio input.

16. The method of claim 13, further comprising:
positioning the channel corresponding to the audio input within a relation to an audio stream corresponding to the audio input based on the determined phase of the audio input and based on the determined peak amplitude of the audio input.

17. The method of claim 13,
wherein determining the phase and determining the peak amplitude are provided in at least one of a software layer, or an API control layer.

18. The method of claim 13, further comprising:
controlling at least one further actuator independent from the determined phase of the audio input and independent from the determined peak amplitude of the audio input.

19. The method of claim 13, further comprising:
high frequency encoding.

20. The method of claim 19, further comprising:
activating the high frequency encoding.

* * * * *